United States Patent
Katz et al.

(10) Patent No.: US 6,873,892 B2
(45) Date of Patent: Mar. 29, 2005

(54) METHOD FOR ADAPTING BODY SUPPORT OF A PASSENGER SEATED IN A VEHICLE SEAT IN TERMS OF VEHICLE MOVEMENTS DYNAMICS AND CORRESPONDING VEHICLE SEAT

(75) Inventors: Egon Katz, Nagold (DE); Klaus-Peter Kuhn, Pluederhausen (DE); Juergen Schrader, Schrader (DE); Wolfram Schroeder, Tuscaloosa, AL (US)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/030,256
(22) PCT Filed: Apr. 4, 2001
(86) PCT No.: PCT/EP01/04285
§ 371 (c)(1), (2), (4) Date: Aug. 5, 2002
(87) PCT Pub. No.: WO01/85487
PCT Pub. Date: Nov. 15, 2001

(65) Prior Publication Data
US 2003/0023363 A1 Jan. 30, 2003

(30) Foreign Application Priority Data
May 9, 2000 (DE) ......................................... 100 22 434

(51) Int. Cl.[7] .............................................. G06F 7/00
(52) U.S. Cl. ...................................................... 701/49
(58) Field of Search ....................... 701/49, 36; 307/9.1

(56) References Cited

U.S. PATENT DOCUMENTS

| 4,655,505 A | | 4/1987 | Kashiwamura et al. ...... 297/284 |
| 5,129,704 A | | 7/1992 | Kishi et al. ............. 297/284 R |
| 5,320,409 A | | 6/1994 | Katoh et al. ............. 297/284.6 |
| 5,707,109 A | | 1/1998 | Massara et al. .......... 297/284.9 |
| 5,975,633 A | * | 11/1999 | Walk et al. ............... 297/284.9 |
| 6,037,731 A | * | 3/2000 | Fruehauf et al. ............ 318/468 |

FOREIGN PATENT DOCUMENTS

| DE | 3541537 | 6/1986 |
| DE | 4201142 | 8/1992 |
| DE | 4401416 | 7/1995 |
| DE | 19750223 | 6/1999 |
| GB | 2285876 | 7/1995 |

* cited by examiner

Primary Examiner—Yonel Beaulieu
(74) Attorney, Agent, or Firm—Crowell & Moring LLP

(57) ABSTRACT

A method for dynamic adaptation of the support, in particular the lateral support, of a person seated on a vehicle seat includes using an adaptation system, which is integrated in the vehicle seat, to determine the adaptation taking into account the current vehicle velocity. In order to compensate for the inherent inertia of the adaptation system, prediction of the adaptation is performed from stored data over the current road course, onto which data the current vehicle data are projected. The adaptation system is actuated taking into account the adaptation time inherent in the system in such a way that, when the event requiring the adaptation occurs, preferably when a bend is traveled through, at least one adaptation presetting is achieved.

23 Claims, 1 Drawing Sheet

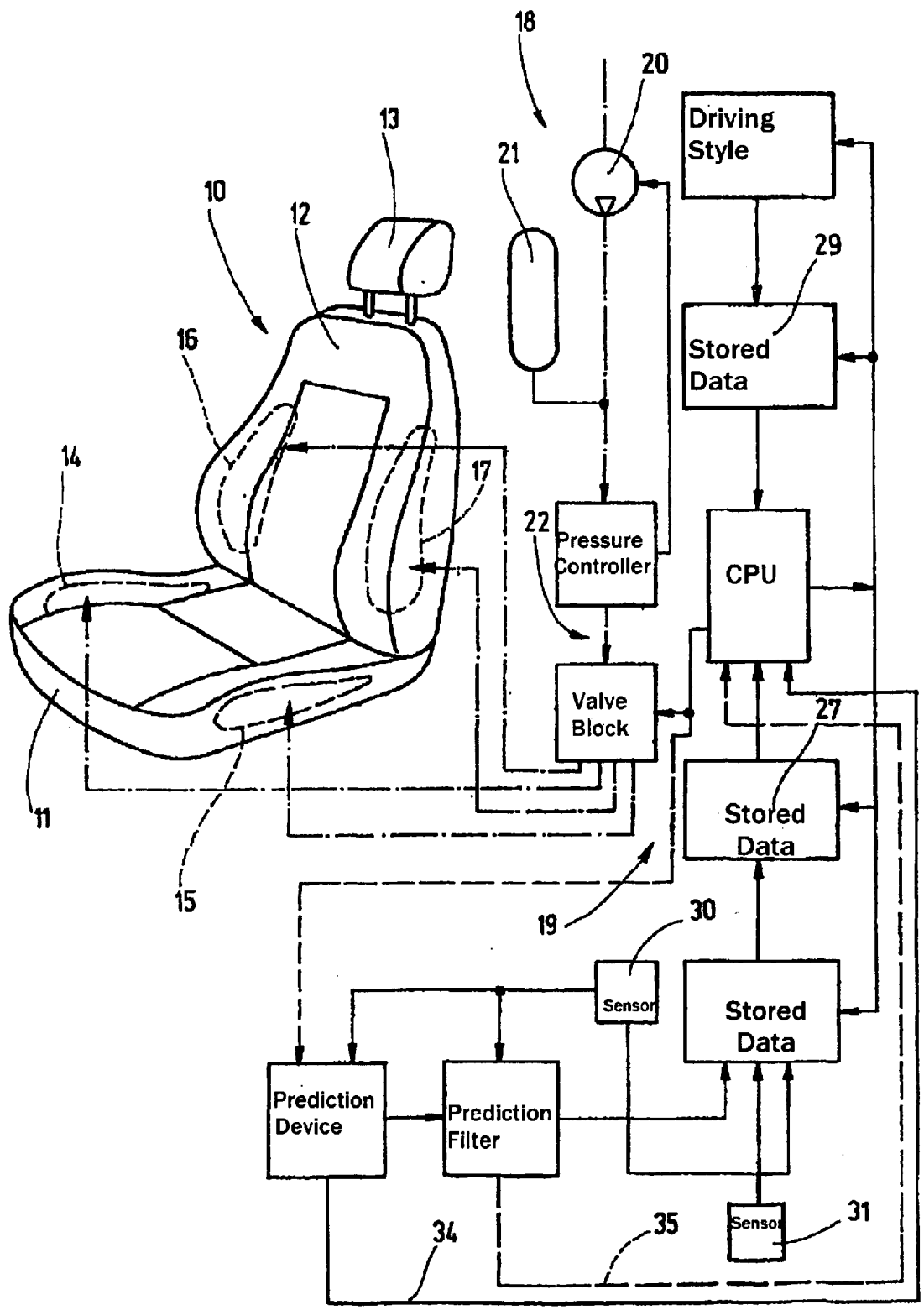

METHOD FOR ADAPTING BODY SUPPORT OF A PASSENGER SEATED IN A VEHICLE SEAT IN TERMS OF VEHICLE MOVEMENTS DYNAMICS AND CORRESPONDING VEHICLE SEAT

The invention relates to a method for the dynamic adaptation of the support of the body, in particular the lateral support, of a person seated on a vehicle seat and a vehicle seat with adaptive body support, in particular lateral support.

A known vehicle seat (DE 35 41 537 A1) which is controlled dynamically has inflatable air cushions for supporting the body of a person seated on the seat. The cushions are integrated as shoulder supports in the upper part of the backrest, as a side support in the right-hand and left-hand sides of the backrest, as a lumbar support, as a side support of the seat cushion on the right and left and as right-hand and left-hand supports for the thighs in the seat upholstery and in the backrest upholstery. Each air cushion is connected to a valve unit. The valve units are actuated by a CPU (central processing unit). Sensors for measuring the driving velocity of the vehicle, the lateral acceleration of the vehicle, the inclination of the vehicle and a rotational angle on the steering wheel supply corresponding measurement data to the CPU, which themselves control the filling or venting of specific air cushions via the valve units as a function of the driving situation and the driving style. In order to provide support when a lateral acceleration occurs, such as when the vehicle turns, the CPU predicts the magnitude of the lateral acceleration which will be exerted on the driver by reference to the instantaneous vehicle velocity and the rotational angle supplied by the sensor on the steering wheel. The CPU then actuates the valve devices for the air cushions to provide the lateral support, in the seat upholstery and backrest upholstery such that the air cushions are filled with a pressure which corresponds to the degree of predicted lateral acceleration.

A known method adapts the lateral support of a person seated on a vehicle seat as a function of the driving situation and driving style (DE 197 50 223 A1). In this method, the lateral acceleration, which acts on the seat, is measured with a lateral acceleration sensor and is determined as a reference variable for the adaptation of the lateral support of the seated person. In order to take the lateral acceleration sensation of the seated person into account to a greater degree, the measured instantaneous lateral acceleration is weighted with the measured instantaneous driving velocity of the vehicle, and a control variable for the degree of adaptation and/or the degree of lateral support is derived therefrom. This generates a more comfortable sitting sensation with the advantages of a necessary lateral holding which is built up at short notice in bends.

A known vehicle velocity control device (DE 42 01 142 A1) has a vehicle navigation system, for example GPS, which indicates the location of a vehicle on a stored digital road map on a screen. The road map supplies information on the road section on which the vehicle is travelling including bends in the road. The vehicle velocity control device receives the information on a bend lying ahead on a road, for example on the radius of curvature of the bend, and calculates the vehicle limiting velocity with which the vehicle can travel on the outside of the bend and travel safely through the bend. This vehicle limiting velocity is compared with the instantaneous vehicle velocity. If the instantaneous vehicle velocity is higher than the limiting velocity, a warning is sent to the driver or velocity-reducing measures are automatically initiated.

The invention is based on the object of configuring a method of the type mentioned at the beginning in such a way that the inertia of the adaptation system used to adapt the body support on the seat is compensated.

This object is achieved according to the invention, as described below.

The method according to the invention has the advantage that a seat setting for adapting the body support to an adaptation event, for example travelling through a bend, is not carried out reactively only when the adaptation event occurs. Rather the seat setting is carried out proactively so that it has already experienced the necessary change when the adaptation event starts. In this way, the delay, inherent in any adaptation system, between the actuation of the adaptation system and the changing of the seat is compensated. The method is thus no longer reliant on sensing and measuring driving manoeuvres which occur but rather adapts to the adaptation event even if the measurements have still not supplied any clear results. The measured results are then only used to correct the seat setting which has been carried out, with only slight adjustment paths which can be overcome virtually without delay. By predicting the degree of necessary seat adaptation from the course of the road and the current vehicle data, the adaptation system can be conditioned with virtually any desired pre-travel and the support of the body can gradually be adapted to the required degree in a way which is virtually imperceptible to the seated person.

The invention is described below in more detail with reference to an exemplary embodiment illustrated in the drawing.

BRIEF DESCRIPTION OF THE DRAWING

FIG. 1 shows a perspective view of a driver's seat for a passenger car with the adaptation system illustrated in the block diagram and controller for the adaptation system.

DETAILED DESCRIPTION OF THE DRAWING

The driver's seat 10 for a passenger car illustrated in FIG. 1 as an exemplary embodiment of a generic car seat, has an upholstered seat part 11 and an upholstered backrest 12 with headrest 13 projecting therefrom. An adaptation system 18 which is integrated into the vehicle seat 10 permits the upholstered contours of the seat part 11 and backrest 12 to be changed to support the body of a seated person in the driver's seat 10 in an optimum fashion. The adaptation system 18 has been limited to providing lateral support to the body, in particular when cornering. For this purpose, the adaptation system 18 has air cushions 14, 15 and 16, 17 which are each integrated in the side bulges of the seat part 11 and backrest 12. If the air cushions 14 to 17 are completely inflated, a maximum lateral support of the driver in the pelvic area and back area is achieved. The support can be reduced as the air pressure in the air cushions 14–17 is decreased. However, in addition to lateral support, shoulder support can also be provided in the upper part of the backrest, lumbar support can be provided in the lower region of the backrest and thigh support can be provided in the front region of the seat part 11. For this purpose, air cushions are also integrated into the corresponding upholstery sections, as is described, for example, in DE 35 41 537 A1.

In order to fill or vent the air cushions 14 to 17, the adaptation system 18 has a compressed air pump 20, a compressed air reservoir 21 and a compressed air regulating device 22 which is connected thereto. The compressed air regulating device 22 comprises a pressure controller 23 which switches the compressed air pump 20 on and off in order to keep a constant excess pressure at the input end, and a solenoid valve block 24 which is capable of applying the input pressure specifically to, the four air cushions 14 to 17. The pressure regulator which is integrated in the solenoid valve block 24 also provides the possibility of reducing the pressure in the air cushions 14 to 17 by venting. The adaptation system 18 is controlled by a control unit 19 which has a central control computer 25 which accesses the solenoid valve block 24 directly, and processing blocks 26 to 29 which are controlled by the control computer 25. Two sensors 30 and 31 are connected to the control unit 19. The sensor 30 measures the current vehicle velocity v, and the sensor 31 measures the current lateral acceleration b acting on the vehicle seat.

A weighting algorithm, which describes the relationship between the vehicle velocity v and the lateral acceleration sensed by the driver, is stored in the block 26. The current lateral acceleration b is transformed into a sensed lateral acceleration with this algorithm. This allows for the phenomenon according to which the driver accepts a high degree of lateral acceleration at a low velocity without desiring lateral support and considers a lateral support desirable at a high velocity even for small lateral acceleration values to be taken into account. A first characteristic curve, which predefines a relationship between sensed lateral acceleration and a corresponding desired degree of single-sided lateral support, is stored in block 27. The sensed lateral acceleration is determined from the currently measured lateral acceleration b and the currently measured vehicle velocity v in block 26. A control variable, which is fed as an electrical signal from the central control computer 25 of the pressure regulating device 22 to the solenoid valve block 24 for setting the output pressure is formed from the characteristic curve in block 27 using the sensed lateral acceleration.

The driving style of the vehicle driver is classified in block 28, as described, for example, in DE 44 01 416 A1. A second characteristic curve, which predefines a relationship between driving style and a corresponding desired degree of lateral support, is stored in block 29. A supplementary control variable is read out of this characteristic curve in the block 29 by means of the classification result from block 28. The supplementary control variable is fed, as an electrical signal, from the CPU 25 to the solenoid valve block 24, and sets an appropriate output pressure. The supplementary control variable leads to the pressure level being set in the adaptation system 18, adapted to the driving style of the driver. The pressure level is applied in all four air cushions 14 to 17 in the driver's seat 10 when the solenoid valve block 24 is actuated, and results in a basic measure of lateral support in the seat 10. After this basic pressure has been set in all air cushions 14 to 17, the solenoid valves are moved to their pressure holding position in the solenoid valve block 24 by the CPU 25.

During cornering, the control variable determined as described above is fed from the block 27 to the CPU 25. In the CPU 25, the control variable and the supplementary control variable are linked, and the electrical signal which is fed to the solenoid valve block 25 produces, in the adaptation system 18, a compressed air setting which corresponds to the superimposition of the control variable and supplementary control variable. Depending on the direction of the current lateral acceleration b, the CPU 25 actuates the corresponding solenoid valves in the solenoid valve block 24. As a result, the pressure in the two air cushions 14 and 16 or 15 and 17, lying on the outside on the bend, of the seat part 11 and the backrest 12 is adjusted to the higher air pressure, while the pressure level in the two other air cushions lying on the inside of the bend continues to correspond to the basic pressure set on the basis of the driving style of the driver which has been determined.

In order to compensate for the inertia which is inherent in the adaptation system 18 and to eliminate the delays between the measuring of the current lateral acceleration b and the setting of the air cushions 14 to 17, a prediction device 32 for determining in advance the value of the lateral acceleration to be expected on a current curve and a prediction filter 33 connected downstream of the prediction device 32 are provided. The prediction filter 33 is connected at the output end of the control unit 19 and applies the predicted lateral acceleration value, supplied by the prediction device 32, to the control unit 19 taking into account the filling time of the adaptation system 18. The filling time is a function of the filling pressure.

In a first exemplary embodiment, the prediction device 32 has a vehicle navigation system and a digital road map which contains route data relating to a traffic network and, if appropriate, attribute data assigned to the route data. As an example of such a prediction device, the vehicle velocity control device described in DE 42 01 142 A1 can be used, which obtains, from the digital road map, information relating to a curve lying ahead and to its attributes, for example its radius of curvature. This vehicle velocity control device calculates with the vehicle data a vehicle limiting velocity with which the vehicle can travel on the outside of the bend and can travel safely through the bend. The vehicle velocity control device can predict without difficulty the lateral acceleration which is to be expected in the bend and which acts on the vehicle given the current vehicle velocity. The current vehicle velocity is fed to the prediction device 32 and to the prediction filter 33 by the vehicle velocity sensor 30.

The method to be followed for the dynamic adaptation of the lateral support of the person seated on the front seat passenger seat will be described below with reference to the example of a bend to be travelled through.

The expected lateral acceleration which acts on the seated person on the bend is predicted, at a relatively large distance before the bend, from the data which is obtained from the stored road map. The data relates to the course of the current road and the current vehicle data which is projected onto the course of the road. The predicted acceleration is transmitted to the control unit 19 and to the processing block 26 via the prediction filter 33, taking into account the filling pressure-dependent delay time of the adaptation system 18 and the instantaneous vehicle velocity which is output by the sensor 30. At this time, an acceleration value which has been output by the sensor 31 is still not present at the control unit 19. As already mentioned, the predicted value of the lateral acceleration is transformed into a sensed lateral acceleration. The degree of single-sided lateral support is determined in the block 27 with this sensed lateral acceleration and a corresponding control variable is transmitted to the CPU 25. The CPU 25 transmits a corresponding electrical control signal to the pressure regulating device 22 which changes the filling pressure in the right-hand or left-hand air cushions 14, 16 or 15, 17 of the seat cushion 17 and backrest 12. Thus, a seat presetting is already carried out for the lateral support when the vehicle travels into the bend, and the lateral acceleration measured at that time by means of the acceleration sensor 31 is then used just to perform a fine correction of the seat presetting by minimum inflation or venting of the air cushions 14 to 17.

The prediction device 32 may additionally be used to signal to the driver in a haptic fashion that the vehicle is approaching the curve ahead at too high a speed. For this purpose, the maximum value of the lateral acceleration during the curve is determined from the limiting velocity determined in the prediction device 32 and compared with the predicted lateral acceleration. If the predicted lateral acceleration exceeds the maximum value determined, a control signal is fed to the CPU 25 via a direct control signal line 34 between the prediction device 32 and the CPU 25. The control signal is converted by the CPU 25 into a control signal for the pressure regulating device 22, and a high filling pressure is suddenly applied to the lateral air cushions 14 and 16 or 15 and 17. The driver is warned in a haptic fashion that the vehicle is approaching the bend too quickly. Depending on the direction of curvature of the bend, the air cushions 14, 16 or 15, 17, which are arranged on the side of the vehicle seat 10, lying on the outside of the bend are filled.

In a further exemplary embodiment, the prediction device 32 can also be modified to store the seat setting or seat adaptation in the digital road map as a learning map. Here, for example, salient points at which pressure changes were made in the air cushions 14 to 17 at a measured vehicle velocity during the first journey are stored in a relationship with the route data as further attributes, referred to as adaptation attributes below. For this purpose, as indicated by dashed lines in FIG. 1, the control signal, which is generated for the compressed air regulating device 22 by the CPU 25, is also fed to the prediction device 32 so that the occurrence and the magnitude of the control signals are stored as location points for seat changes in the learning road map. When the route section is travelled along again, these adaptation attributes are used by the prediction filter 33 to determine the time of an action by applying a predicted value of the lateral acceleration to the block 26 of the control unit 19. In addition, it is also possible to store the predicted lateral acceleration, as a function of the velocity and the route data, in the learning road map. When the same route section is travelled along again, a lateral acceleration which has already been predicted can thus be accessed again, and only needs to be converted with respect to the current vehicle velocity.

In an alternative embodiment of the prediction device 32 and prediction filter 33, the prediction filter 33 is directly connected to the CPU 25 by a further control signal line 35 which is indicated by dashed lines in FIG. 1. In this case, the filling pressures, which are applied to the air cushions 14 to 17 by the CPU 25 via the pressure regulating device 22, are stored as a function of a velocity, for example, as a pressure changing point or pressure level in the learning road map in a relationship with the route data. When the same route section is travelled along again, the stored pressure levels are then applied directly as predicted pressure levels, scaled with the current vehicle velocity, to the CPU 25 to form the prescribed set point pressure value. The CPU 25 then itself actuates the pressure regulating device 22 in order to set the set point pressures in the air cushions 14 to 17.

The invention is not restricted to the described exemplary embodiment of an adaptation system 18 embodied as a pneumatic system. In theory, any adaptation system which changes the lateral contour of the vehicle seat 10 can be used. The described method is also not restricted to implementing lateral support of the driver or further vehicle occupants during cornering. It is also possible to change the lumbar support or the support of the thighs in the seat cushions as functions of the expected course of the road section which is currently being travelled along, for example in the road sections with severe negative or positive gradients.

What is claimed is:

1. Method for dynamic adaptation of the support of the body of a person seated on a vehicle seat, the method comprising:

predicting and setting, by an adaptation system which is integrated in the vehicle seat, desired adaptation at a point on a curved road before the vehicle arrives at the point taking into account current vehicle velocity from stored road data;

actuating the adaptation system taking into account the adaptation time inherent in the system, whereby when an event requiring the adaptation occurs, at least one adaptation presetting adapted thereto is achieved.

2. Method according to claim 1, wherein a correction of the adaptation presetting is carried out with currently measured vehicle data during the event requiring the adaptation.

3. Method according to claim 1, wherein the current road course is obtained from a digital road map which contains route data relating to a traffic network and attribute data assigned to the route data, in that data of seat adaptations which have been carried out is stored in an assignment to route data as adaptation attributes in the road map, and in that, when the route section is traveled along again, the adaptation system is actuated using the adaptation attributes.

4. Method according to claim 3, wherein a velocity-corrected adaptation measure is stored as adaptation attribute.

5. Method according to claim 1, wherein in order to determine the adaptation measure required when a bend is traveled through, the expected lateral acceleration which acts on the vehicle seat is predicted and the degree of lateral support is thus calculated.

6. Method according to claim 2, wherein when the bend is being traveled through the lateral acceleration which really occurs is measured and the degree of lateral support is thus corrected.

7. Method according to claim 3, wherein the predicted and/or measured lateral acceleration is stored as adaptation attribute.

8. Method according to claim 5, wherein when the maximum value of the lateral acceleration which is derived from a predicted limiting velocity for traveling through a bend is exceeded by the predicted lateral acceleration a warning signal for the driver is issued.

9. Method according to claim 8, wherein the warning signal is fed to the driver in a haptic way by suddenly increasing the lateral support on the side of the seat which is on the outside in the direction of curvature of the bend.

10. Vehicle seat comprising:

a seat part, a backrest, an adaptation system for adapting body support of a person seated on the vehicle seat, the adaptation system including air cushions which are integrated at least in side bulges of the seat part and/or backrest, and a compressed air regulating device for adjusting the air pressure in the air cushions, a control unit which has a control computer and is connected to the compressed air regulating device and generates, from a lateral acceleration value fed to the control unit, a control signal for setting a filling pressure by the pressure regulating device, a sensor connected to the control unit for measuring the vehicle velocity, a prediction device for predicting the lateral acceleration expected in a current curve, and a prediction filter which applies the predicted lateral acceleration to the control unit taking into account the filling pressure-dependent filling times of the adaptation system.

11. Vehicle seat according to claim 10, wherein the prediction device has a digital road map which contains route data relating to a traffic network and attribute data assigned to the route data, in that time points of a change in filling pressure by the compressed air regulating device can be stored in a relationship with the vehicle velocity and the route data as adaptation attributes in the road map, and in that, when the route section is traveled along again, the prediction filter adapts the adaptation attributes to the current driving velocity and uses it to specify the time when the predicted lateral acceleration is applied to the control unit.

12. Vehicle seat according to claim 10, wherein the prediction device has a digital road map which contains route data relating to a traffic network and attribute data assigned to the route data, in that filling pressures which are implemented by the compressed air regulating device can be stored, in a velocity-corrected fashion, in a relationship with the route data as adaptation attributes in the road map, and in that, when the route section is traveled along again, the prediction filter directly applies the adaptation attributes to the control computer as set point pressure values.

13. Vehicle seat according to claim 10, wherein the prediction device predicts a maximum value of the lateral acceleration from a predicted limiting velocity with which a current bend can be traveled through, and in that when the maximum value is exceeded by the predicted lateral acceleration, said prediction device applies a maximum pressure value as a set point pressure value for setting the filling pressure in the filling cushions which are arranged on the side of the vehicle seat located on the outside in the direction of curvature of the bend.

14. A method for dynamic adaptation of vehicle seat support, the method comprising:
    predicting a desired seat support at a point on a curved road section on the basis of vehicle velocity from stored road data for a road which the vehicle is traveling on before the vehicle arrives at the point on the curved road, and
    actuating an adaptation system to provide a seat support based on the predicted desired seat support when the vehicle arrives at the point on the curved road section, taking into account delays in the adaptation system.

15. The method according to claim 14, wherein predicting a desired seat support includes:
    predicting a lateral acceleration in the curved road section on the basis of vehicle velocity from the stored road data; and
    predicting the desired seat support based on the predicted lateral acceleration.

16. The method according to claim 15, wherein when a maximum value of the lateral acceleration for the curved road section is exceeded by the predicted lateral acceleration a warning signal for the driver is issued.

17. The method according to claim 15 further comprising providing the seat support partially based on lateral acceleration measured when the vehicle is traveling in the curved road section.

18. The method according to claim 14 further comprising storing data with the predicted desired seat support as a function of vehicle velocity and road location along a road the vehicle is traveling on so that the stored data can be used in the future to predict desired seat support on the basis of vehicle speed and location on the road when the vehicle travels again on the same road.

19. The method according to claim 14 further comprising storing data with pressure, which is supplied to seat cushions to provide seat support, as a function of vehicle velocity and road location along a road the vehicle is traveling on so that the stored data can be used in the future to predict seat cushion pressure on the basis of vehicle speed and location on the road when the vehicle travels again on the same road.

20. The method according to claim 14 further comprising storing data with lateral acceleration as a function of vehicle velocity and road location along a road the vehicle is traveling on so that the stored data can be used in the future to predict lateral on the basis of vehicle speed and location on the road when the vehicle travels again on the same road.

21. A vehicle seat system comprising:
    a vehicle seat;
    an adaptation system for adapting the vehicle seat for body support, the adaptation system including,
    air cushions which are integrated in the vehicle seat, and
    a compressed air regulating device for adjusting air pressure in the air cushions;
    a control unit including a control computer, the control unit being connected to the compressed air regulating device for setting air cushion pressure;
    a vehicle speed sensor, the vehicle speed sensor being connected to the control unit;
    a prediction device that predicts lateral acceleration in a curved road section before the vehicle arrives at the curved road section; and
    a prediction filter that-sends the predicted lateral acceleration to the control unit to set air cushion pressure in accordance with a desired seat setting for the predicted lateral acceleration when the vehicle arrives at the curved road section, taking into account a delay of the adaptation system.

22. The vehicle seat system according to claim 21, wherein the prediction device is configured to store data with air cushion pressure as a function of vehicle velocity and road location along a road the vehicle is traveling on so that the stored data can be used in the future to predict cushion pressure on the basis of vehicle speed and location on the road when the vehicle travels again on the same road.

23. The vehicle seat system according to claim 21, wherein the prediction device is configured to store data with lateral acceleration as a function of vehicle velocity and road location along a road the vehicle is traveling on so that the stored data can be used in the future to predict lateral acceleration on the basis of vehicle speed and location on the road when the vehicle travels again on the same road.

* * * * *